G. B. RANDOLPH.
LAND MARKER.
APPLICATION FILED FEB. 18, 1909.
Reissued Dec. 9, 1913.
13,656.
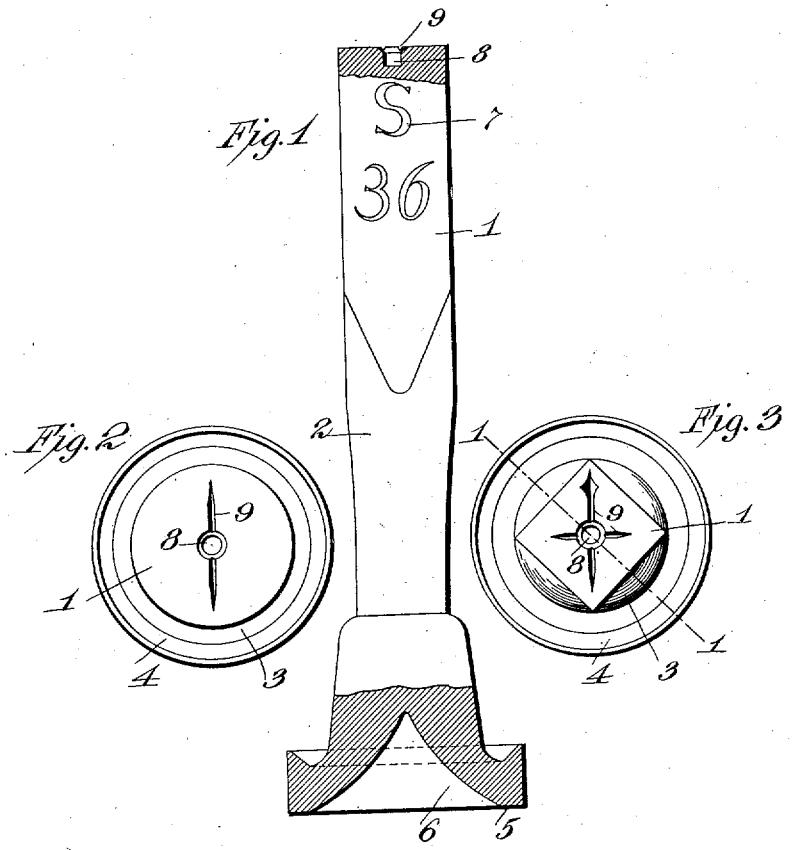
Witnesses:
Jas. F. Coleman
John Stotch.
Inventor
George Brown Randolph
By Dyer & Dyer
His Attorneys.
COLUMBIA PLANOGRAPH CO., WASHINGTON, D. C

UNITED STATES PATENT OFFICE.

GEORGE BROWN RANDOLPH, OF ANNISTON, ALABAMA.

LAND-MARKER.

13,656. Specification of Reissued Letters Patent. Reissued Dec. 9, 1913.

Original No. 898,602, dated September 15, 1908, Serial No. 432,938. Application for reissue filed February 18, 1909. Serial No. 478,750.

*To all whom it may concern:*

Be it known that I, GEORGE B. RANDOLPH, a citizen of the United States, residing at Anniston, in the county of Calhoun and State of Alabama, have invented a new and useful Land-Marker, of which the following is a specification.

This invention has relation to land markers and it consists in the novel construction and arrangement of its parts as will be hereinafter shown and described.

The object of the invention is to provide an indestructible land marker which may be permanently positioned in the ground and when so positioned serves as a mark for establishing the lines of a survey and which prevents obliteration as a consequence of fire or decay or the acts of vandals or other vicious persons.

The marker is in the form of a unitary body and is composed of material which is not affected by extremes of heat or cold and consequently is of an indestructible nature and its configuration is such that the pressure of the surrounding earth is sufficient to maintain the body in proper position in the soil and hold the same in its proper position against the action of or outer forces applied to the body.

The markers heretofore used for the purpose of defining lines of surveys have been unsatisfactory for several reasons. When stone or metal posts can be used for such purposes and such markers are provided with straight or vertical sides they are easily pulled out of the ground and may be thrown away or put to other uses as it is claimed has been the case with many of the original marking stones of Mason and Dixon line for such stones have been removed from the ground and used for building purposes. When markers are used which may be easily and readily removed or displaced much confusion ensues between the owners of adjacent pieces of property and such confusion frequently leads into expensive litigation and sometimes violence of more or less seriousness. Again where markers are used in woodlands or timber lands they are almost invariably destroyed as a consequence of each large fire in the forest and consequently the surveys have to be made anew.

It is the object of the present invention to provide an indestructible marker the use of which will overcome the disadvantages above pointed out, and with these objects in view the marker consists of a unitary body of peculiar configuration which will be hereinafter described. The body is preferably composed of concrete cement reinforced with steel but its composition may be of any other suitable indestructible material. The upper end of the marker is provided with a cavity which is adapted to receive the end of the flagman's pole and suitable characters or inscription may be placed upon the upper end portions of the marker for the purpose of designating the direction in which the line lies or give other information concerning the character of the survey or the nature of the metes and bounds.

In the accompanying drawing: Figure 1 is a side elevation of the marker partly in section, such section being taken along the line 1—1 of Fig. 3. Fig. 2 is a top plan view of one form of the marker, and Fig. 3 is a top plan view of another form of the marker.

As above stated the marker is a unitary body and may be made out of indestructible material such for instance as cement concrete reinforced with steel or it may be composed of any other suitable material.

In the particular embodiment of my invention chosen for illustration, the marker comprises an upper shaft portion 1 which merges into the shank portion 2. The said shank portion, as illustrated, is conical, but such shape is not essential and may be changed without departing from the spirit of the invention. The said shank portion 2 is transversely reduced in dimension and merges at its lower smaller end into the upper end of the substantially hollow bell-shaped base portion 3. The base portion 3 at its lower end is greater in transverse dimensions that the superposed portions of the marker and the base portion 3 is provided in the vicinity of its lower end with a groove 4 which is located beyond vertical lines depending from the extremities of the transverse dimensions of the superposed portion of the marker. The lower surface of the base portion 3 beyond the bounds of the hollow 6 in the said portion lies in a plane as at 5. It is within the scope of my invention to make the superposed portions of the marker of a shaft portion only and without the shank portion, whether tapering or otherwise.

The shaft 1 may be substantially rectangular in transverse sections or it may be cylindrical. When it is of rectangular configuration in transverse section the angles and corners should be rounded off in order that the said shaft portion would not be chipped or cracked when encountered by vehicle wheels. The upper portion of the shaft portion 1 may also be provided with suitable characters as those shown at 7 for designating the bounds of land sections or other plots of ground. The upper end of shaft portion 1 is provided at its center with a cavity 8 which is adapted to receive the end of a flagman's pole when lines are being run. The upper face also contains indicating media 9, for the purpose of designating the direction in which the line lies, such media consisting of a single groove (Fig. 2) or a long groove, with an arrow head at one end, and a shorter intersecting groove at right angles thereto, as shown in Fig. 3. These grooves lie diagonally across the upper face when such upper face is square, as shown, in Fig. 3. When the post is placed at the intersection of four sections, the grooves will lie north and south, and also east and west. This will bring a square side of the post opposite each section, with the character indicated at 7 toward the respective section. The structure illustrated in Fig. 2 is for marking two sections, and if square instead of cylindrical, as illustrated, its sides will lie square with the lines.

When the marker is embedded in the ground, all of the portions thereof below and including the conical shank portion 2 are below the surface and the shaft portion 1 is above the surface of the ground. The shaft portion 1 is vertically disposed and this may be accomplished by using a spirit level at the top of the said shaft and by placing the plane surface 5 of the base 3 level upon the bottom of the excavation made to receive the marker. When the earth has been filled in around the lower portion of the marker, the weight thereof bears upon the upper surface of the base portion 3 and in the groove 4 thereof, thus rendering it difficult for the said marker to be lifted or pulled out of the ground. At the same time the earth from below projects up into the hollow 6 of the base 3 of the marker and prevents the marker from becoming laterally displaced in consequence of force applied laterally thereto and also prevents the said marker from having a tendency to lean to one side or the other. Also as the shank portion is conical and downwardly disposed, and as that portion of the marker is below but nearest the surface of the ground the freezing and thawing of the ground will have no tendency to lift the marker out of the ground.

Having described my invention what I claim as new and desire to secure by Letters Patent, is:—

1. A marker comprising a body having a shaft portion with a reduced conical shank and a base merging with the smaller end of the shank and being of greater transverse dimensions than the superposed portions and having a groove which lies beyond vertical lines coincident with the extremities of the transverse dimensions of the superposed portions.

2. A marker comprising a body having a shaft portion with a reduced conical shank and a hollow bell-shaped base merging with the smaller end of the shank and being of greater transverse dimensions than the superposed portions, said base being grooved at its outer portions, the under surface of the base beyond the bounds of the hollow therein occupying a plane.

3. A marker comprising a body, having a shaft portion and a base, the said base being of greater transverse dimensions than the superposed portions, and having a groove which lies beyond vertical lines coincident with the extremities of the transverse dimensions of the superposed portions.

4. A marker comprising a body having a shaft portion and a base, the said base being of greater transverse dimensions than the superposed portions, and having a groove which lies beyond vertical lines coincident with the extremities of the transverse dimensions of the superposed portions, said base having in its lower side a conical hollow for the reception of earth.

In testimony that I claim the foregoing as my own, I have hereto affixed my signature in the presence of two witnesses.

GEORGE BROWN RANDOLPH.

Witnesses:

R. M. Ingram,

A. B. Sawyer.

Copies of this patent may be obtained for five cents each, by addressing the "Commissioner of Patents, Washington, D. C."